US005780728A

United States Patent [19]

Takamori

[11] Patent Number: 5,780,728

[45] Date of Patent: Jul. 14, 1998

[54] DIAGNOSIS APPARATUS AND METHOD FOR AN EVAPO-PURGE SYSTEM

[75] Inventor: Katsuhito Takamori, Mitaka, Japan

[73] Assignee: Fuji Jukogyo Kabushiki Kaisha, Tokyo, Japan

[21] Appl. No.: 429,245

[22] Filed: Apr. 25, 1995

[30] Foreign Application Priority Data

Apr. 27, 1994 [JP] Japan ........ 6-090328

[51] Int. Cl.$^{6}$ ........ G01M 15/00

[52] U.S. Cl. ........ 73/116; 73/117.2

[58] Field of Search ........ 123/520, 516, 123/518; 73/40, 46, 47, 49.7, 116, 117.2, 117.3

[56] References Cited

U.S. PATENT DOCUMENTS

| | | | |
|---|---|---|---|
| 5,176,123 | 1/1993 | Hosoda et al. | 123/520 |
| 5,178,117 | 1/1993 | Fujimoto et al. | 123/520 |
| 5,188,085 | 2/1993 | Habaguchi et al. | 123/520 |
| 5,237,979 | 8/1993 | Hyodo et al. | 123/520 |
| 5,273,020 | 12/1993 | Hayami | 123/520 |
| 5,299,544 | 4/1994 | Kitamoto et al. | 123/520 |
| 5,335,638 | 8/1994 | Mukai | 123/520 |
| 5,353,770 | 10/1994 | Osanai et al. | 123/520 |
| 5,355,864 | 10/1994 | Kuroda et al. | 123/520 |
| 5,371,412 | 12/1994 | Iswashita et al. | 123/520 |
| 5,375,579 | 12/1994 | Mukai | 123/520 |
| 5,390,644 | 2/1995 | Nunogaki et al. | 123/520 |
| 5,443,051 | 8/1995 | Otsuka | 123/520 |
| 5,465,703 | 11/1995 | Abe | 123/520 |
| 5,511,529 | 4/1996 | Blumenstock et al. | 123/520 |

*Primary Examiner*—Richard Chilcot
*Assistant Examiner*—Eric S. McCall
*Attorney, Agent, or Firm*—Beveridge, DeGrandi, Weilacher & Young, LLP

[57] ABSTRACT

In the general mode, the pressure sensor is communicated with an intake pipe through the first diverged tube by the directional valve so that the sensor can measure the pressure in the intake pipe. Also, in the evapo-purge mode, the pressure sensor is communicated with the purge line through the second diverged tube by the directional valve so that the sensor can measure pressures in the purge line produced when the purge control valve is closed and open. That is, the pressure sensor for measuring a pressure in the purge line is also adapted for measuring the pressure in the intake pipe of the engine. Also, a predetermined range of the difference between the pressures can be settled depending on the load of the engine, such as an engine speed, an intake pipe negative pressure, a throttle opening, and a fundamental injection pulse duration.

23 Claims, 7 Drawing Sheets

| | | PURGE CONTROL VALVE | | | FLOW | |
|---|---|---|---|---|---|---|
| | | NORMAL | CLOSE | OPEN | SMALL (LEAK) | LARGE |
| DETECTED VALUE BY PRESSURE SENSOR | PURGE IN PROGRESS P1 | mmHg -45 | 0 | -45 | -30 | -60 |
| | PURGE IN SUSPENSION (=ATOMOSPHERIC PRESSURE) P2 | mmHg 0 | 0 | -45 | 0 | 0 |
| $\Delta P = P2 - P1$ | | mmHg 45 | 0 | 0 | 30 | 60 |

FIG. 11

DIAGNOSIS APPARATUS AND METHOD FOR AN EVAPO-PURGE SYSTEM

BACKGROUND OF THE INVENTION

1. Field of the Invention

The present invention relates to a diagnosis apparatus and method for an evapo-purge system, in which an evaporated fuel in a fuel tank is accumulated in a canister and the accumulated evaporated fuel is purged into an engine.

2. Information of the Related Art

In general, vehicles such as automobiles are furnished with a so-called evapo-purge system in order to prevent a gas of fuel evaporated in a fuel tank from being discharged in the air. In this evapo-purge system, the evaporated fuel gas is absorbed by activated charcoal or the like and accumulated in a canister, and the gas in the canister is purged into a combustion chamber of an engine through an inlet tube under set operating conditions.

In case the evapo-purge system goes wrong, the system brings about low efficiency of emission and high fuel consumption, as well as air pollution. Therefore, many vehicles are provided with a function for diagnosing the evapo-purge system.

Disclosed in laid-open Japan Utility Model Application Publication No. 2-26754 (1990), for example, is a diagnosis apparatus in which gas circulation in a purge pipe connecter between a canister and an intake pipe. The gas in the purge pipe is detected by a pressure sensor (negative-pressure sensor) during evapo-purge operation, and an abnormal state is discriminated in accordance with the state of gas circulation.

Disclosed in laid-open Japan Patent application Publication No. 4-36056 (1992), moreover, is a diagnosis apparatus in which a purge line between a canister and an intake pipe is provided with a sensor for detecting combustible gas. An abnormal state is detected in accordance with the difference between sensor outputs obtained during purge operation and the time when the purge operation is suspended.

Described in laid-open Japan Patent application Publication No. 4-58057 (1992), furthermore, is a diagnosis apparatus in which a predetermined amount of fuel vapor is adsorbed by fuel vapor adsorbing means (canister). It is concluded that there is some trouble in case the purge gas concentration detected during purge operation never varies beyond a predetermined value.

In the conventional diagnosis for an evapo-purge system, however, detection of pressures, purge gas concentration, etc. requires exclusive-use sensors, thus entailing an increase in cost.

SUMMARY OF THE INVENTION

The object of the present invention is to provide a diagnosis apparatus and method for an evapo-purge system, in which the diagnosis can be accomplished without using exclusive-use sensors, thus ensuring a reduction in cost, that is, a pressure sensor for measuring a pressure in a purge tube is also adapted for measuring a pressure in an intake pipe of an engine, and further the diagnosis can be accomplished with a high accuracy.

According to one aspect of the present invention, a diagnosis apparatus for an evapo-purge system having a canister for storing an evaporated fuel generated from a fuel tank, an intake pipe connected to an engine for inducing air thereof, and a purge line connected to the canister, comprising: a control valve, installed in the purge line for controlling the purge flow rate; a directional valve connected between the intake pipe and the purge line via a first tube diverged from the intake pipe and a second tube diverged from the purge line; and a pressure sensor, in a general mode, communicated with the intake pipe through the first diverged tube by switching the directional valve and measuring a pressure in the intake pipe and, in a evapo-purge mode, communicated with the purge tube through the second diverged tube by switching the directional valve and measuring pressures in the purge line produced when the purge control valve is closed and open.

In the general mode, the pressure sensor may be communicated with the intake pipe through the first diverged tube by the directional valve so that the sensor can measure the pressure in the intake pipe. Also, in the evapo-purge mode, the pressure sensor is communicated with the purge line through the second diverged tube by the directional valve so that the sensor can measure pressures in the purge line produced when the purge control valve is closed and open. In summary, the pressure sensor for measuring a pressure in the purge line is also adapted for measuring the pressure in the intake pipe of the engine. Accordingly, the diagnosis for the evapo-purge system can be accomplished without using exclusive-use sensors, so that some outstanding effects can be obtained including a reduction in cost.

Further, when the evapo-purge system is concluded to be normal, the measured value of the pressure in the purge line produced when the purge control valve is closed can be regarded as equivalent to the atmospheric pressure so that the measured value is adapted for some other control of the engine. That is, the atmospheric pressure value measured by means of the pressure sensor is fixed to the predetermined value. Thus, controllability can be secured for some other diagnosis or control which uses the measured atmospheric pressure value with the same timing, whereby the system can be made fail-safe.

According to another aspect of the present invention, the diagnosis apparatus for an evapo-purge system having a canister for storing an evaporated fuel generated from a fuel tank, an intake pipe connected to an engine for inducing air thereof, and a purge line connected to the canister, comprising: a control valve, installed in the purge line, for controlling the purge flow rate; a pressure sensor, in a evapo-purge mode, communicated with the purge line and measuring pressures in the purge line produced when the purge control valve is closed and open; and discriminating means for discriminating the evapo-purge system to be abnormal in case the difference between the measured value of the pressure in the purge line produced when the purge control valve is closed and the measured value of the pressure in the purge line produced when the purge control valve is open is outside a predetermined range which is settled depending on the load of the engine.

The predetermined range of the difference between the pressures can be set depending on the load of the engine, such as an engine speed, an intake pipe negative pressure, a throttle opening, and a fundamental injection pulse duration. Therefore, the diagnosis can be accomplished depending on the load which change momentarily as in the drive mode so that an accurate diagnosis result can be obtained.

BRIEF DESCRIPTION OF THE DRAWINGS

FIG. 11 is a table illustrating a case in which the detected atmospheric pressure value is fixed.

DETAILED DESCRIPTION OF THE PREFERRED EMBODIMENT

A preferred embodiment of the present invention will become understood from the following detailed description referring to the accompanying drawings.

Figure 3:
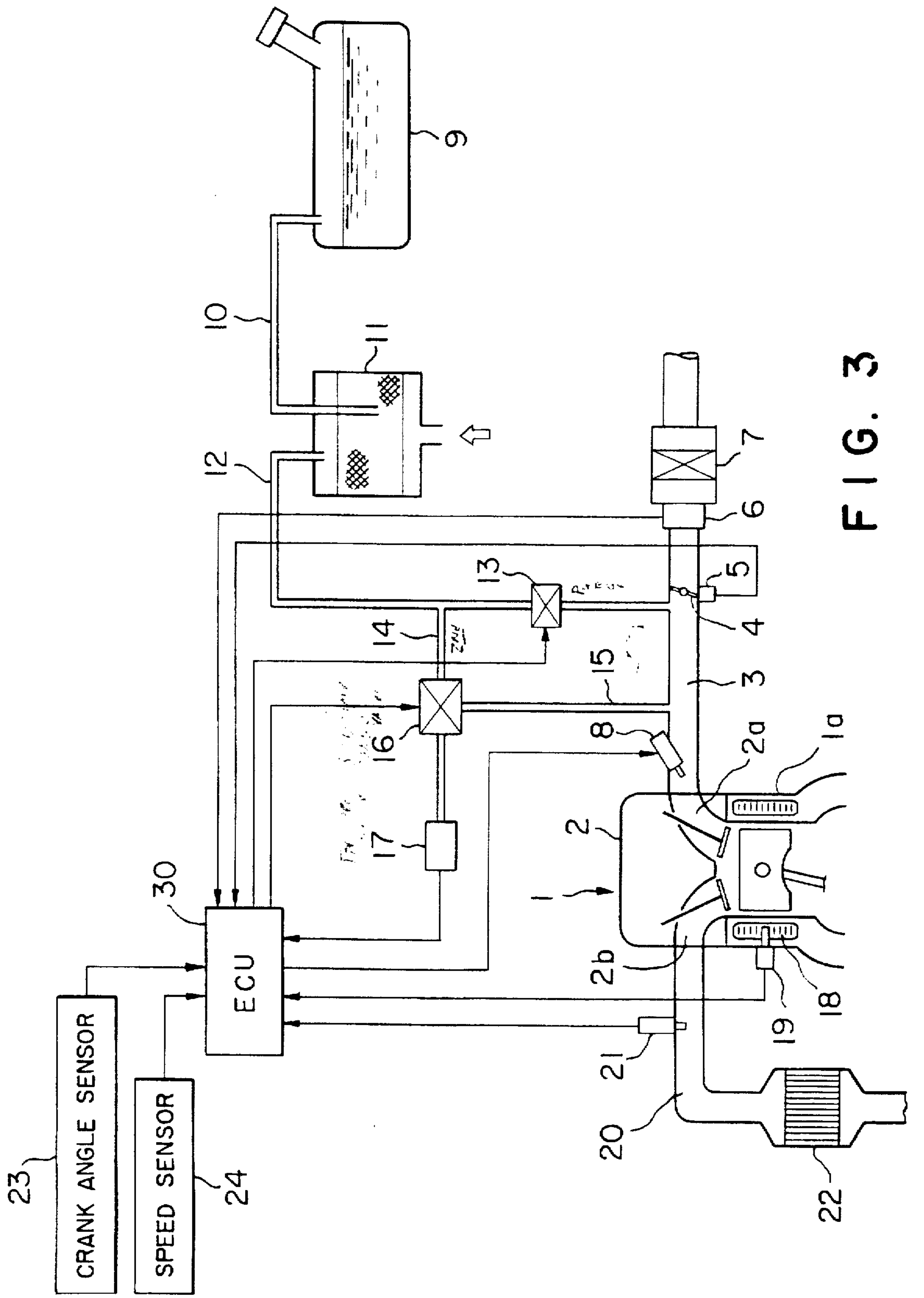
FIG. 3 is a schematic view of an engine control system.

In FIG. 3, an intake pipe 3 opens into each inlet port 2a which is formed in a cylinder head 2 of an engine 1, and a throttle valve 4 is attached to the intake pipe 3. The valve 4 is provided with a throttle opening sensor 5 for detecting an opening degree of the throttle valve 4, and an intake air sensor 6 is located on the upper-course side of the sensor 5. Further, an air cleaner 7 is attached to that portion of the tube 3 which is situated on the upper-course side of the intake air sensor 6.

The cylinder head 2 is fitted with spark plugs (not shown) for each cylinder. An injector 8 is opposed to that portion of each cylinder which is situated just at the upstream side of each inlet port 2a. The injector 8 communicates with a fuel tank 9 by a fuel pipe (not shown) so that a fuel adjusted to a predetermined pressure can be injected into the inlet port 2a.

An evaporated fuel gas discharge line (evapo-line) 10 for discharging an evaporated fuel generated in the fuel tank 9 extends from the top portion of the tank 9, and opens into the top portion of a canister 11 which has an adsorbing unit formed of activated charcoal. The canister 11 has a fresh air inlet port at its bottom portion which is open to the atmosphere. A purge line 12 for guiding evaporated fuel gas stored in the adsorbing unit, along with fresh air from the fresh air inlet port, extends from the top portion of the canister 11.

The purge line 12 communicates with the intake pipe 3 by a purge control valve 13 formed of a two-position open-close valve or a linear solenoid valve whose valve opening is controlled in response to a duty signal.

Also, the purge line 12 diverges between the canister 11 and the purge control valve 13. A branch line 14 and a pressure detecting tube 15, which communicates with that portion of the intake pipe 3 on the down stream side of the throttle valve 4, are connected to a pressure sensor 17 through a directional control valve 16, i.e., a two-way selector valve.

The pressure sensor 17 is also used for highland correction in air-fuel ratio control, diagnosis in EGR control, etc., as well as for the diagnosis in evapo-purge control according to the present invention. Thus, an exclusive-use pressure sensor need not be provided for the diagnosis for an evapo-purge system, resulting in a reduction in cost.

A temperature sensor 19 is opposed to a coolant passage 18 which is formed in a cylinder block la of the engine 1, and an $O_2$ sensor 21 is opposed to an exhaust pipe 20 which opens into an exhaust port 2b of the cylinder head 2. A catalytic converter 22 is attached to that portion of the exhaust pipe 20 which is situated on the downstream side of the $O_2$ sensor 21.

On the other hand, an electronic control unit (ECU) 30 is connected with sensors, including the throttle opening sensor 5, the intake air sensor 6, the pressure sensor 17, the temperature sensor 19, the $O_2$ sensor 21, a crank angle sensor 23, a vehicle speed sensor 24, etc., and actuators including the injector 8, the purge control valve 13, the directional control valve 16, etc.

Figure 4:
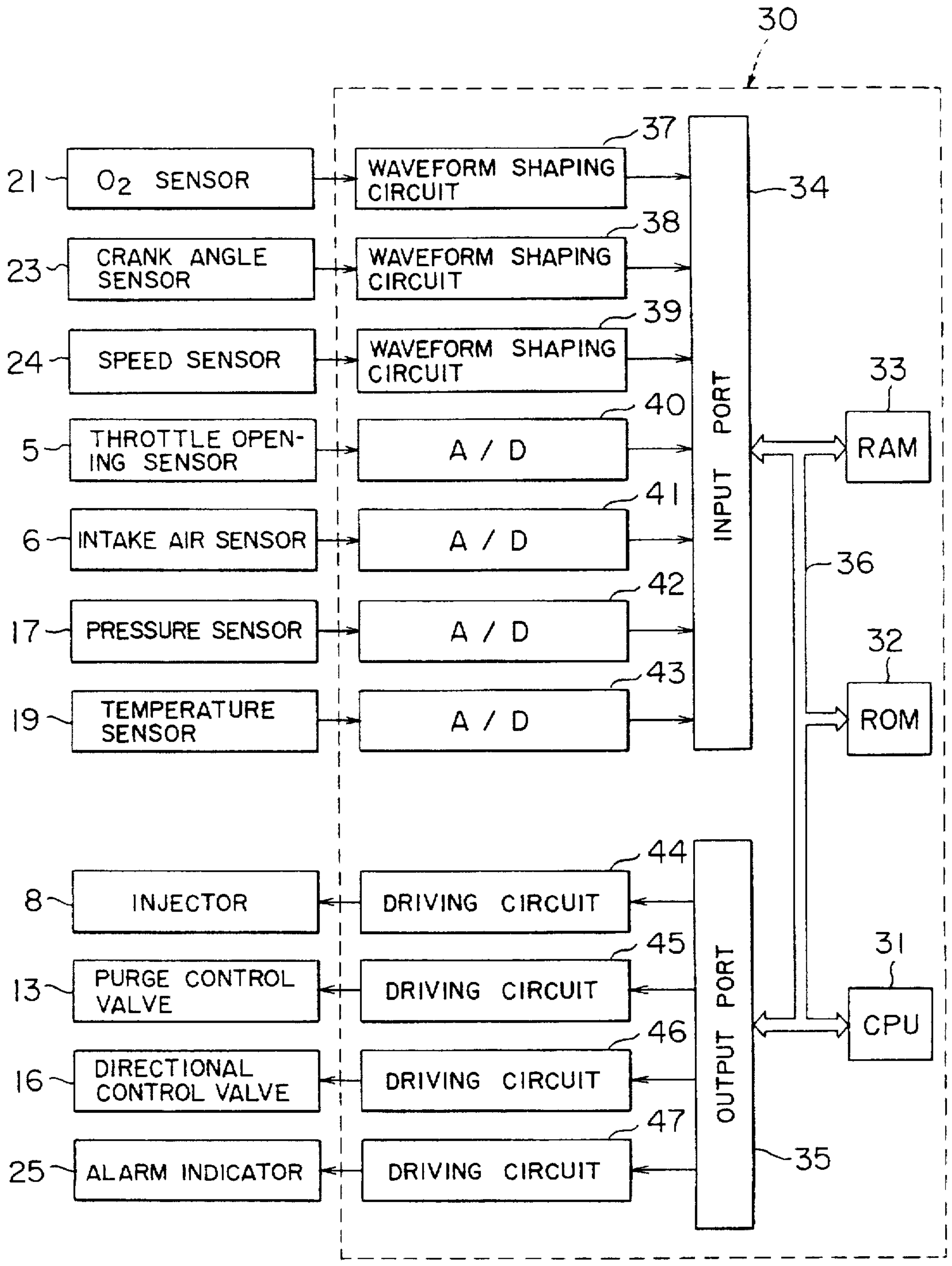
FIG. 4 is a circuit diagram of a control unit.

As shown in FIG. 4, the ECU 30 has a microcomputer and peripheral circuits. In the microcomputer, a CPU 31, ROM 32, RAM 33, input port 34, and output port 35 are connected to one another by a bus line 36.

The input port 34 is connected with the $O_2$ sensor 21, the crank angle sensor 23, and the car speed sensor 24 through waveform shaping circuits 37, 38 and 39, respectively, and is also connected with the throttle opening sensor 5, the intake air sensor 6, the pressure sensor 17, and the temperature sensor 19 through A/D converters 40, 41, 42 and 43, respectively. The output port 35 is connected with the injector 8, the purge control valve 13, the directional control valve 16, and an alarm indicator 25 (mentioned later) through driving circuits 44, 45, 46 and 47, respectively.

The ROM 32 is stored with control programs and fixed data for various control operations, while the RAM 33 is loaded with output signals from the aforesaid various sensors and switches after data processing and data processed by the CPU 31. The CPU 31 carries out an air-fuel ratio control, an ignition timing control, a purge control, and etc. in accordance with the control programs stored in the ROM 32, and diagnoses the evapo-purge system for failure. If the evapo-purge system is concluded to be out of order, the CPU 31 causes the alarm indicator 25 to indicate an abnormal state, thereby giving an alarm to a driver.

Referring now to the flowchart of FIG. 1, the diagnosis process for the evapo-purge system executed by the ECU 30 will be described.

Figure 1:
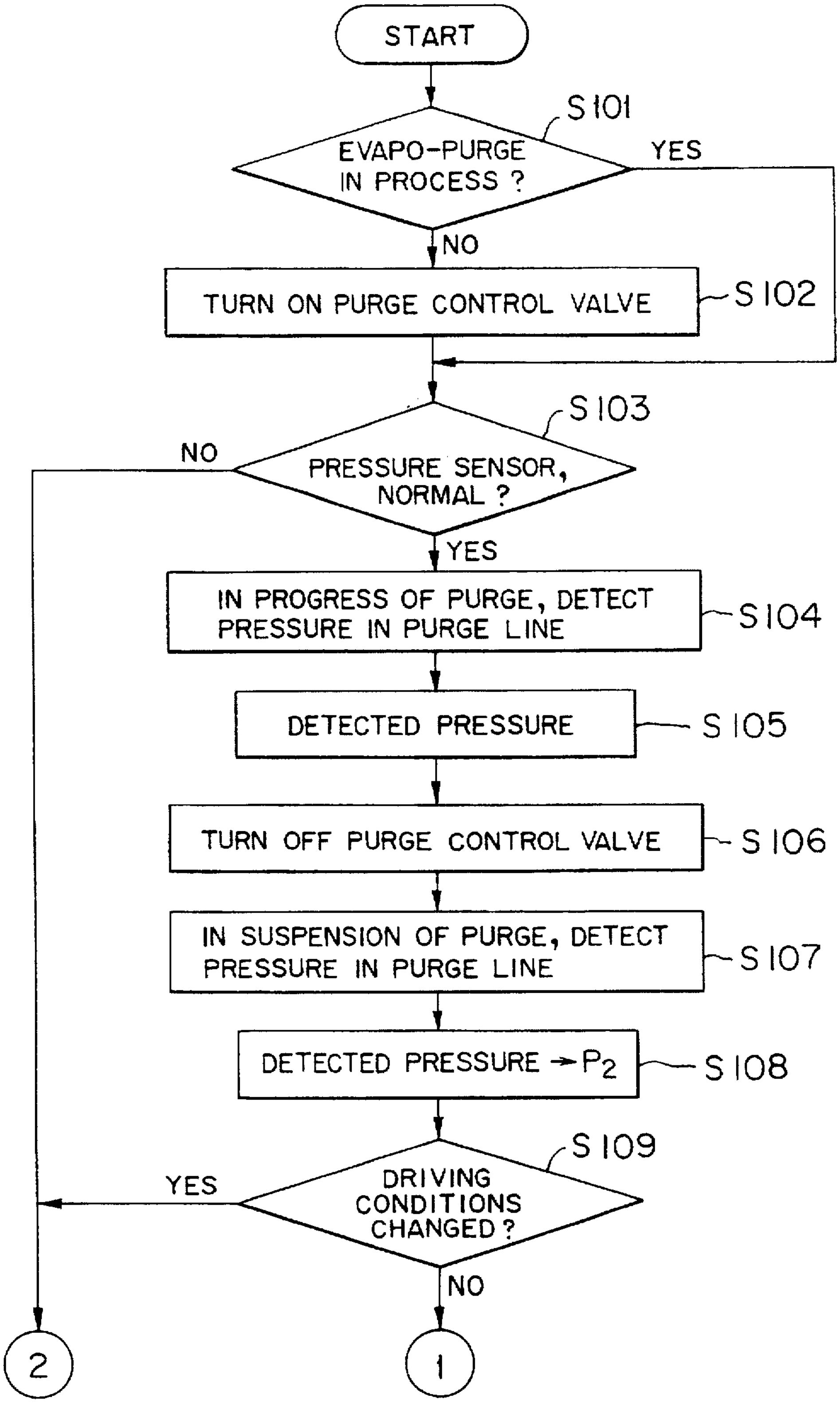
FIG. 1 is a flowchart showing an evapo-purge system diagnosis process.
Figure 2:
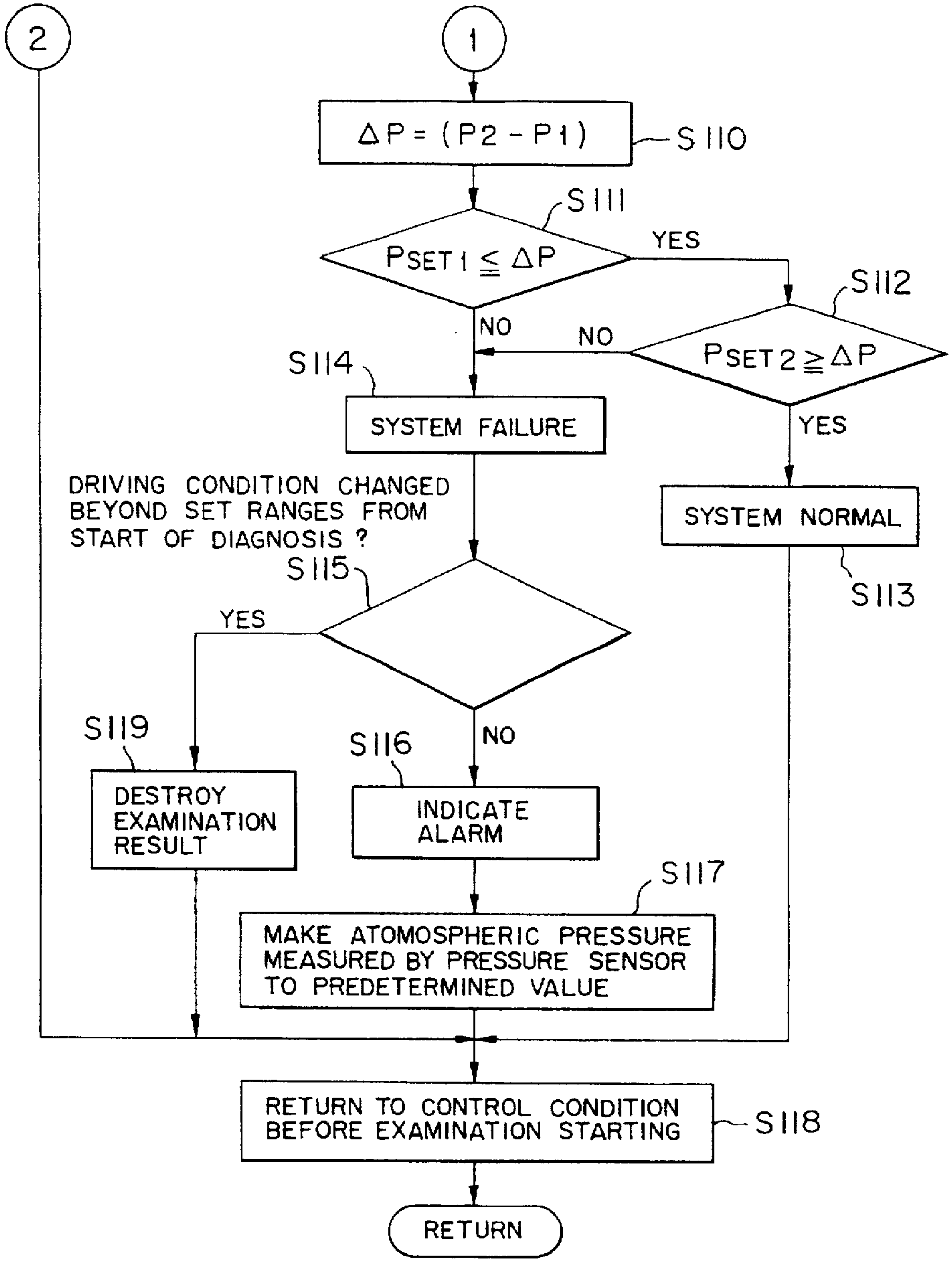
FIG. 2 is a continuation of the flowchart of FIG. 1.

A first cycle of the program shown in FIG. 1 is executed by, for example, interruption or the like when the operating conditions become ready for the diagnosis in a predetermined time after the start of the engine 1. That is, when the engine 1 is fully warmed up with a predetermined temperature detected by the temperature sensor 19. Diagnosis conditions are fulfilled under the operating conditions which allow evapo-purge operation to be executed except during idling or decelerating operation. After this, the program is executed by interruption or the like every time the diagnosis conditions are fulfilled at regular intervals.

The diagnosis conditions for the evapo-purge operation are given as set areas which are settled depending on one or a combination of parameters which represent engine loads such as an inlet-tube negative pressure Pb, throttle opening θ, and fundamental injection pulse duration Tp, running environment conditions (highland/lowland running) such as an atmospheric pressure Po, and engine speed Ne. The fulfillment of the diagnosis conditions is determined by whether or not the engine operating conditions are covered by these set areas.

Figure 5:
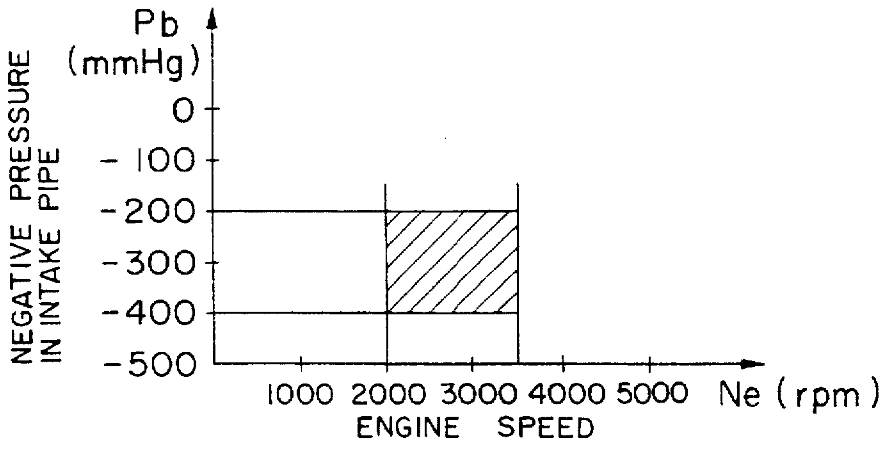
FIG. 5 is a graph showing a diagnosis area based on an intake pipe negative pressure and an engine speed.
Figure 6:
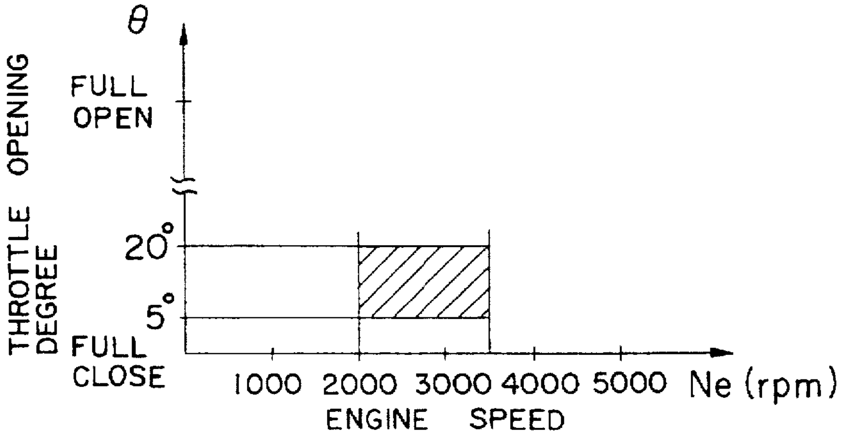
FIG. 6 is a graph showing the diagnosis area based on a throttle opening and the engine speed.
Figure 7:
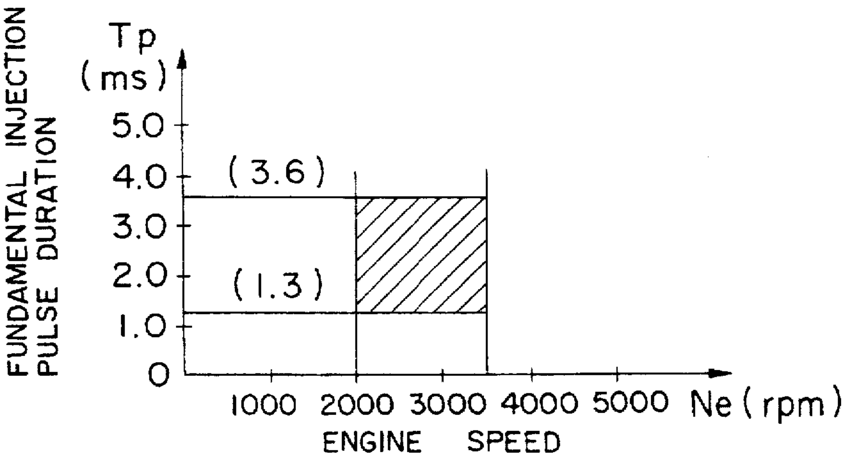
FIG. 7 is a graph FIG. showing the diagnosis area based on a fundamental injection pulse duration and the engine speed.

The diagnosis condition areas are specifically shown in the form of hatched medium-load areas in FIGS. 5, 6 and 7. In the medium-load area of FIG. 5, the inlet-tube negative pressure Pb ranges from about −200 mmHg to −400 mmHg, and the engine speed Ne ranges from about 2,000 rpm to 3,500 rpm. In the medium-load area of FIG. 6, the engine speed Ne ranges from about 2,000 rpm to 3,500 rpm with the throttle opening e ranging from about 5° to 20°. In the medium-load area of FIG. 7, the fundamental injection pulse duration Tp ranges from about 1.3 ms to 3.6 ms, and the engine speed Ne ranges from about 2,000 rpm to 3,500 rpm. By starting the diagnosis for the evapo-purge system when the engine operating conditions are covered by these areas, the diagnosis can be accomplished in a reliable drive area without being affected by unstable conditions which change momentarily as in the overdrive mode. Thus, an accurate diagnosis result can be obtained.

When the program starts after the diagnosis conditions are fulfilled, it is determined in Step 101 whether or not the evapo-purge operation is in process. If the operation is found to be in process, the program jumps to Step 103. If the evapo-purge operation is in suspension, the purge control valve 13 is turned on in Step 102. If the valve 13 is a two-position open-close valve, it is fully opened. If it is a linear solenoid valve, the purge control valve 13 is adjusted to a predetermined valve opening the conformable to the operating conditions in response to the duty signal. Therefore, a state for the execution of the evapo-purge operation is entered compulsorily, whereupon the program advances to Step 103.

In Step 103, it is determined whether or not the pressure sensor 17 is concluded to be normal in accordance with a program for some other diagnosis process. If the sensor 17 is concluded to be abnormal, the diagnosis is suspended, whereupon the program jumps to Step 118, which will be mentioned later. If the sensor 17 is concluded to be normal, the program advances to Step 104, whereupon the directional control valve 16 is switched to allow the branch line 14 from the purge line 12 to communicate with the pressure sensor 17, and the pressure in the line 12 is measured during the evapo-purge operation.

Then, the program advances to Step 105, whereupon the pressure in the purge line 12 detected in Step 104 is stored as a pressure P1 in the RAM 33. In Step 106, the purge control valve 13 is turned off to suspend the evapo-purge operation. In Step 107, the pressure in the purge line 12 is measured while the evapo-purge operation is in suspension. Then, in Step 108, the pressure detected in Step 107 is stored as a pressure P2 in the RAM 33, whereupon the program advances to Step 109.

In Step 109, it is determined whether or not the engine operating conditions have changed beyond set ranges. If the engine operating conditions are concluded to have changed beyond the set ranges, the diagnosis is interrupted, whereupon the program jumps to Step 118. If the engine operating conditions are in a substantially steady state which is covered by the set ranges, the program advances to Step 110.

Thus, the diagnosis for the evapo-purge system is conducted on the basis of a differential pressure ΔP between a pressure detected when the evapo-purge operation is in process and a pressure detected when the evapo-purge operation is in suspension. If the engine speed, an intake pipe negative pressure, a fundamental injection pulse duration, an intake air amount, etc. change substantially beyond the set ranges, though within the limits of the examining conditions, it is difficult to detect an abnormal state by the detected pressure value. Even though the engine operating conditions are covered by the diagnosis conditions, therefore, the diagnosis is interrupted to avoid making wrong decisions if the operating conditions change beyond the set ranges.

When the program advances from Step 109 to Step 110 with the engine operating conditions in the substantially steady state, the differential pressure ΔP (P1−P2) between the pressures P1 and P2 stored in the RAM 33 is obtained. In Step 111, the differential pressure ΔP is compared to a first decision value $P_{SET1}$, an abnormality criterion for an insufficient purge flow. If $P_{SET1}>\Delta P$ is obtained, the system is concluded to be out of order in Step 118. If $P_{SET1}\leqq\Delta P$ is obtained, the differential pressure ΔP is further compared to a second decision value $P_{SET2}$, an abnormality criterion for an excessive purge flow, in Step 112. If $P_{SET2}<\Delta P$ is obtained in Step 112, the program diverges to Step 114, whereupon the system is concluded to be out of order. If $P_{SET2}\geqq\Delta P$ is obtained, the program advances to Step 113, whereupon the system is concluded to be normal. Then, the program proceeds to Step 118.

When the evapo-purge operation is in suspension, there is no flow of the evaporated fuel gas in the purge line 12, so that the pressure detected by the pressure sensor 17 is equal to the pressure in the canister 11, whose adsorbing unit is open to the atmosphere at the bottom. In consequence, the pressure detected by the sensor 17 when the evapo-purge operation is suspended can be regarded as equivalent to the atmospheric pressure. The measured value of the atmospheric pressure is utilized as data for some other control or the diagnosis.

If the evapo-purge operation is executed normally, on the other hand, the pressure sensor 17 detects a reduction of the pressure caused by the flow of the evaporated fuel gas in the purge line 12. Accordingly, the pressure detected during the evapo-purge operation is lower than the pressure detected when the evapo-purge operation is in suspension.

Therefore, the differential pressure ΔP between the pressure detected during the evapo-purge operation and the pressure detected when the evapo-purge operation is in suspension is compared to the first decision value $P_{SET1}$, the abnormality criterion for an insufficient purge flow, and then to the second decision value $P_{SET2}$, the abnormality criterion for an excessive purge flow. Therefore, failures can be detected including blocking of the purge control valve 13, jamming in the purge line 12, deterioration of the canister 11, leakage from piping, etc.

The predetermined value or range of the differential pressure ΔP can be settled depending on the load of the engine, such as the engine speed, the intake negative pressure, the throttle opening, and a fundamental injection pulse duration.

Figure 8:
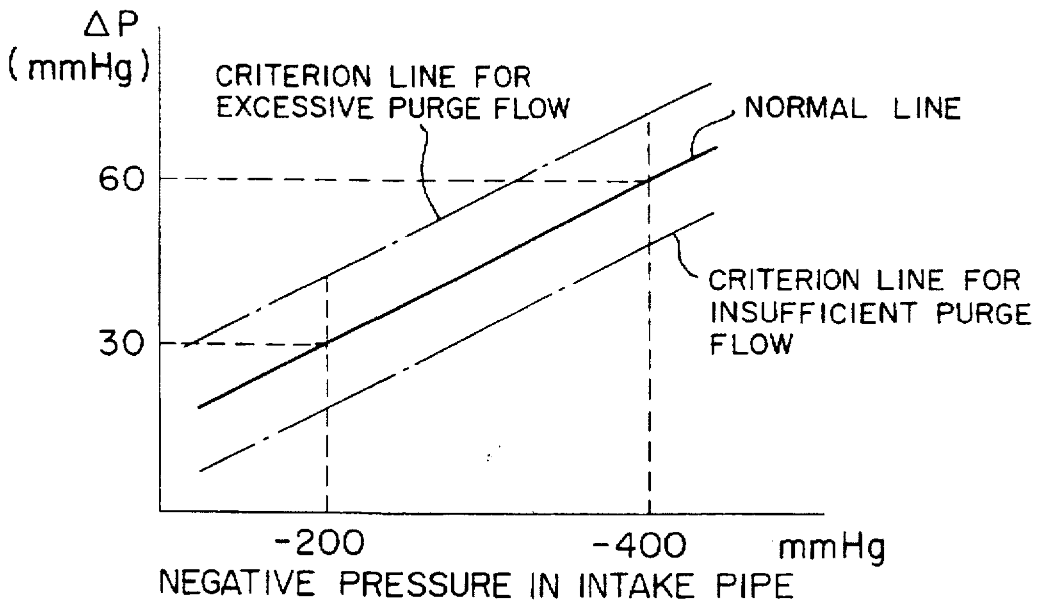
FIG. 8 is a graph showing the relationship between a purge line pressure and decision values.

The decision values for the differential pressure ΔP to decide excessive and insufficient purge flows are preliminarily obtained through the experiments or the like depending on the intake-pipe negative pressure, thereby to define the relationships between the decision values and the intake-pipe negative pressure by operation expressions. Such relationship is indicated by criterion lines for excessive and insufficient purge flows in FIG. 8. Since, therefore, during the diagnosis, decision values $P_{SET1}$ and $P_{SET2}$ corresponding to an intake-pipe negative pressure are merely calculated from the operation expressions, respectively, the memory capacity can be saved.

Figure 9:
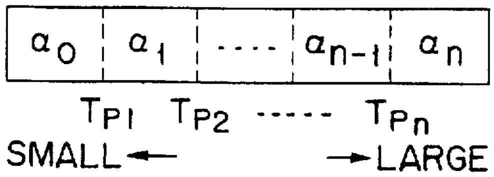
FIG. 9 is a decision value table.

Moreover, the processing speed can be improved by, for example, tabulating values α0, α1, . . . , αn corresponding to the individual decision values with the fundamental injection pulse duration Tp used as a parameter, as shown in FIG. 9, so that the values can be retrieved from the table with the fundamental injection pulse duration as the parameter.

Figure 10:
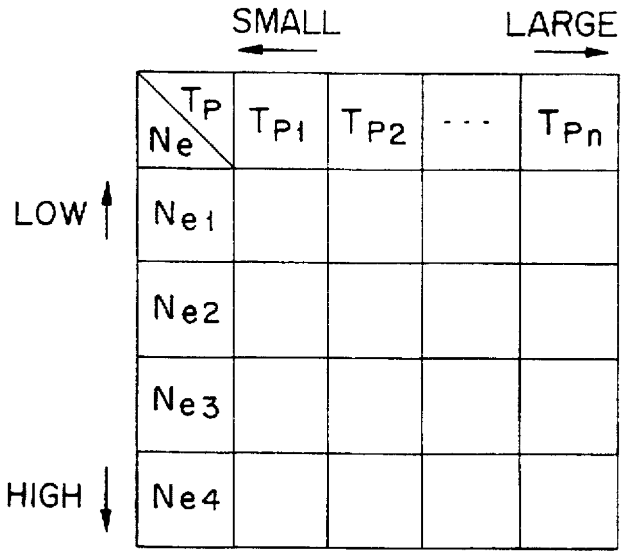
FIG. 10 is a decision value map.

Furthermore, the processing is carried out in the following manner in the case where the purge flow rate is finely controlled with the purge control valve 13 subjected to duty control by means of a duty value which is set in accordance with the fundamental injection pulse duration Tp and the engine speed Ne. The individual decision values are previously loaded into a map with the fundamental injection pulse duration Tp and the engine speed Ne used as parameters, as shown in FIG. 10. Thus, the processing speed can be increased, and the diagnosis can be improved in accuracy.

If it is concluded, thereafter, that the system is out of order, the program advances from Step 114 to Step 115, whereupon it is determined whether or not the current engine operating conditions (operating conditions after the end of the diagnosis) have changed beyond the set ranges from the engine operating conditions before the start of the diagnosis.

If it is concluded in Step 115 that there is no change beyond the set ranges from the operating conditions before the start of the diagnosis, the alarm indicator 25 indicates an abnormal state, thereby giving a warning to the driver, in Step 116. In Step 117, the measured value of the atmospheric pressure detected by means of the pressure sensor 17 is fixed a predetermined value, whereupon the program advances to Step 118.

In a failure such that the purge control valve 13 is left open, among other failures shown in FIG. 11, for example, the valve 13 is virtually absent, so that the pressure value P2 (indicated by hatching) detected when the purge operation is in suspension, which should be equal to the atmospheric pressure, inevitably becomes equal to the pressure value P1 detected during the purge operation. Accordingly, the pressure sensor 17 measures the atmospheric pressure value in a faulty state such that the purge control valve 13 is left open. If this measured value is used at the same time to effect highland correction in air-fuel ratio control, the diagnosis in EGR control, and some other control, the whole engine control system may get out of order in some cases.

In case the evapo-purge system is found to be out of order, therefore, the atmospheric pressure measured by the pressure sensor 17 is fixed to a predetermined value just high enough to secure controllability at the least, thereby making the system fail-safe.

If it is concluded in Step 115 that the engine operating conditions have changed beyond the set ranges from the operating conditions before the start of the diagnosis, on the other hand, the program diverges from Step 115 to Step 119, whereupon the diagnosis result obtained in Step 114 is abandoned. Then, the program advances to Step 118.

When the program proceeds to Step 118 after the aforesaid processes of Steps 103, 109, 113, 117 and 119 are executed, the state established before the start of the diagnosis is restored, whereupon the program is quit. Thus, the purge control valve 13 is turned off in the case where the diagnosis is interrupted in Step 103 or 109 with the valve 13 kept ON when the evapo-purge operation is in suspension at the start of the diagnosis. In the case where the purge control valve 13 is turned off in Step 106 during the evapo-purge operation at the start of the diagnosis, the valve 13 is turned on to establish an evapo-purge state.

The following is a description of a specific example of the diagnosis method according to the present invention.

(1) Diagnosis method for an evapo-purge system in which the measured value of the pressure in the purge line obtained when the control valve is stopped is adjusted to the atmospheric pressure.

In this diagnosis method for an evapo-purge system, the pressure sensor, which is also used for some other diagnosis or control, is connected to the purge line through the directional control valve, under the engine operating conditions conformable to the diagnosis conditions, the pressure in the purge line produced when the purge control valve for controlling the purge flow rate is actuated is measured, and the pressure in the purge line produced when the purge control valve is stopped is adjusted to the atmospheric pressure which is utilized as data for some other control or the diagnosis. In case the difference between the pressure values is outside the set range, the evapo-purge system is concluded to be abnormal.

(2) Diagnosis method for the evapo-purge system in which the set range is obtained by table or map retrieval.

In this diagnosis method for an evapo-purge system, the pressure sensor, which is also used for some other diagnosis or control, is connected to the purge line through the directional control valve, under the engine operating conditions conformable to the diagnosis conditions, and the pressure in the purge line produced when the purge control valve for controlling the purge flow rate is actuated and the pressure in the purge line produced when the purge control valve is stopped are measured. In concluding the evapo-purge system to be abnormal in case the difference between the pressure values is outside the set range, the set range is obtained by table or map retrieval, whereby the processing speed can be improved.

(3) The diagnosis method for the evapo-purge system in which the set range is setted according to an operational expression which depends on normal-state data of the difference between the measured value of the pressure in the purge line produced when the purge control valve is actuated and the measured value of the pressure in the purge line produced when the purge control valve is stopped.

In this diagnosis method for the evapo-purge system, the pressure sensor, which is also used for some other diagnosis or control, is connected to the purge line through the directional control valve, under the engine operating conditions conformable to the diagnosis conditions, and the pressure in the purge line generated when the purge control valve for controlling the purge flow rate is actuated and the pressure in the purge line produced when the purge control valve is stopped are measured. In concluding the evapo-purge system to be abnormal in case the difference between the pressure values is outside the set range, this set range is set according to the operational expression which depends on the normal-state data of the difference between the measured value of the pressure in the purge line generated when the purge control valve is actuated and the measured value of the pressure in the purge line generated when the purge control valve is stopped, whereby the memory capacity can be saved.

(4) The diagnosis method for the evapo-purge system in which the diagnosis conditions are set in accordance with one of or a combination of parameters indicative of the engine load, running environment conditions, and engine speed conditions.

In this diagnosis method for the evapo-purge system, the pressure sensor, which is also used for some other diagnosis or control, is connected to the purge line through the directional control valve, under the engine operating conditions conformable to the diagnosis conditions, which are set in accordance with one of or a combination of the parameters indicative of the engine load, the running environment conditions, and the engine speed conditions. Also, the pressure in the purge line generated when the purge control valve for controlling the purge flow rate is actuated and the pressure in the purge line generated when the purge control valve is stopped are measured, and the evapo-purge system is concluded to be abnormal in case the difference between the pressure values is outside the set range. Therefore, the diagnosis can be accomplished in a reliable drive area without being affected by unstable conditions which change momentarily as in the transient mode. Thus, an accurate diagnosis result can be obtained.

(5) The diagnosis method for the evapo-purge system in which the diagnosis is interrupted when the engine operating conditions during the diagnosis are changed beyond set ranges.

In this diagnosis method for the evapo-purge system, the pressure sensor, which is also used for some other diagnosis or control, is connected to the purge line through the directional control valve, under the engine operating conditions conformable to the diagnosis conditions, and the pressure in the purge line generated when the purge control valve for controlling the purge flow rate is actuated and the pressure in the purge line generated when the purge control valve is stopped are measured. In concluding the evapo-purge system to be abnormal in case the difference between the pressure values is outside the set range, the diagnosis is interrupted when the engine operating conditions are changed beyond the setted ranges, whereby wrong decisions can be avoided.

(6) The diagnosis method for the evapo-purge system in which the result of the diagnosis is abandoned when the differences between the engine operating conditions at the start of the diagnosis and the engine operating conditions after the end of the diagnosis exceed set ranges.

In this diagnosis method for the evapo-purge system, the pressure sensor, which is also used for some other diagnosis or control, is connected to the purge line through the directional control valve, under the engine operating conditions conformable to the diagnosis conditions, and the pressure in the purge line generated when the purge control valve for controlling the purge flow rate is actuated and the pressure in the purge line generated when the purge control valve is stopped are measured. In concluding the evapo-purge system to be abnormal in case the difference between the pressure values is outside the set range, the diagnosis result is abandoned when the differences between the engine operating conditions at the start of the diagnosis and after the end of the diagnosis exceed the set ranges. Therefore, the system diagnosis can be improved in accuracy.

(7) The diagnosis method for the evapo-purge system in which the diagnosis is suspended when the pressure sensor is concluded to be out of order.

In this diagnosis method for an evapo-purge system, the pressure sensor, which is also used for some other diagnosis or control, is connected to the purge line through the directional control valve, under the engine operating conditions conformable to the diagnosis conditions, and the pressure in the purge line generated when the purge control valve for controlling the purge flow rate is actuated and the pressure in the purge line generated when the purge control valve is stopped are measured. In doing this, the diagnosis is suspended to avoid wrong decisions when the pressure sensor is concluded to be out of order.

(8) The diagnosis method for the evapo-purge system in which the atmospheric pressure value measured by the pressure sensor is fixed to the predetermined value when the evapo-purge system is concluded to be abnormal.

In this diagnosis method for the evapo-purge system, the pressure sensor, which is also used for some other diagnosis or control, is connected to the purge line through the directional control valve, under the engine operating conditions conformable to the diagnosis conditions, and the pressure in the purge line generated when the purge control valve for controlling the purge flow rate is actuated and the pressure in the purge line generated when the purge control valve is stopped are measured. In case the difference between the pressure values is outside the set range, the evapo-purge system is concluded to be abnormal, whereupon the atmospheric pressure value measured by the pressure sensor is fixed to the predetermined value. By doing this, controllability can be secured for some other diagnosis or the control which uses the measured atmospheric pressure value with the same timing, whereby the system can be made in fail-safe mode.

According to the present invention, as described above, the pressure sensor, which is also used for some other diagnosis or the control, is connected to the purge line through the directional control valve, under the engine operating conditions conformable to the diagnosis conditions, the pressure in the purge line generated when the purge control valve for controlling the purge flow rate is actuated and the pressure in the purge line generated when the purge control valve is stopped are measured, and the evapo-purge system is concluded to be abnormal in case the difference between the pressure values is outside the set range. Accordingly, the diagnosis for the evapo-purge system can be accomplished without using exclusive-use sensors, so that some outstanding effects can be attained including a reduction in cost.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A diagnosis apparatus for an evapo-purge system having a canister for storing an evaporated fuel generated from a fuel tank, an intake pipe connected to an engine for inducing air thereof, and a purge line connected to said canister, comprising:

a purge control valve installed in the purge line for controlling purge flow rate;

a directional valve connected between the intake pipe and the purge line via a first tube diverged from the intake pipe and a second tube diverged from the purge line;

a pressure sensor, in a general mode, communicated with the intake pipe through the first diverged tube by switching the directional valve and measuring a pressure in the intake pipe and, in a evapo-purge mode, communicated with the purge line through the second diverged tube by switching the directional valve and measuring pressures in the purge line when the purge control valve is closed and open; and discriminating means for discriminating the state of the evapo-purge system;

wherein when the evapo-purge system is concluded to be normal, the measured value of pressure in the purge line produced when the purge control valve is closed can be regarded as equivalent to atmospheric pressure so that the measured value is adapted for some other control of the engine, and is concluded to be abnormal when the measured values are of a difference falling outside a predetermined range between pressure in the purge line produced when the purge control valve is closed and pressure in the purge line produced when the purge control valve is open.

2. The diagnosis apparatus for an evapo-purge system according to claim 1, wherein the predetermined range is settled depending on load of the engine.

3. A diagnosis method for an evapo-purge system having a canister for storing an evaporated fuel generated from a fuel tank, an intake pipe connected to an engine for inducing air thereof, and a purge line connected to said canister, comprising steps of:

installing a control valve for controlling purge flow rate in the purge line;

installing a directional valve connected between the intake pipe and the purge line by a first tube diverged from the intake pipe and a second tube diverged from the purge line;

connecting a pressure sensor, in a general mode to the intake pipe through the first diverged tube by switching the directional valve and measuring a pressure in the intake pipe and, in a evapo-purge mode, connecting the pressure sensor to the purge line through the second diverged tube by switching the directional valve and measuring pressures in the purge line produced when the purge control valve is closed and open, so wherein when engine operating conditions satisfy examining conditions, said pressure sensor measures the pressures in the purge line produced when the purge control valve is closed and open;

connecting an electronic controller to the directional valve for controlling the switching of the direction of the directional valve; and discriminating the evapo-purge system to be abnormal in case a difference between a measured value of pressure in the purge line produced when the purge control valve is closed and the measured value of pressure in the purge line produced when the purge control valve is open is outside a predetermined range.

4. A diagnosis method for an evapo-purge system having a canister for storing an evaporated fuel generated from a fuel tank, an intake pipe connected to an engine for inducing air thereof, and a purge line connected to said canister, comprising steps of:

installing a control valve for controlling purge flow rate in the purge line;

installing a directional valve connected between the intake pipe and the purge line by a first tube diverged from the intake pipe and a second tube diverged from the purge line;

connecting a pressure sensor, in a general mode, to the intake pipe through the first diverged tube by switching the directional valve and measuring a pressure in the intake pipe and, in a evapo-purge mode, connecting the pressure sensor to the purge line through the second diverged tube by switching the directional valve and measuring pressures in the purge line produced when the purge control valve is closed and open, so wherein when engine operating conditions satisfy examining conditions, said pressure sensor measures the pressures in the purge line produced when the purge control valve is closed and open; and discriminating the evapo-purge system where when the evapo-purge system is concluded to be normal, the measured value of pressure in the purge line produced when the purge control valve is closed can be regarded as equivalent to atmospheric pressure so that the measured value is adapted for some other control of the engine, and where the evapo-purge system is determined to be abnormal in case the measured pressure between the measured value of the pressure in the purge line produced when the purge control valve is closed and the measured value of the pressure in the purge line produced when the purge control valve is open is outside a predetermined range.

5. A diagnosis method during engine operation for an evapo-purge system having a canister for storing an evaporated fuel generated from a fuel tank, an intake pipe connected to an engine for inducing air thereof, and a purge line connected to said canister, comprising steps of:

providing a control valve for controlling purge flow rate in the purge line;

providing a directional valve connected between the intake pipe and the purge line by a first tube diverged from the intake pipe and a second tube diverged from the purge line;

providing a pressure sensor connected, in a general mode, to the intake pipe through the first diverged tube by switching the directional valve and measuring a pressure in the intake pipe and, in a evapo-purge mode, providing the pressure sensor connected to the purge line through the second diverged tube by switching the directional valve and measuring pressures in the purge line produced when the purge control valve is closed and open, wherein when engine operating conditions satisfy examining conditions, said pressure sensor measures the pressures in the purge line produced when the purge control valve is closed and open; and discriminating the evapo-purge system to achieve a diagnosis where the evapo-purge system is determined to be abnormal when subtraction of the measured value of the pressure in the purge line produced when the purge control valve is closed and the measured value of the pressure in the purge line produced when the purge control valve is open yields a difference outside a predetermined range and disregarding the diagnosis when conditions during engine operation at the start and end thereof exceed a set value.

6. A diagnosis method during engine operation for an evapo-purge system having a canister for storing an evaporated fuel generated from a fuel tank, an intake pipe connected to an engine for inducing air thereof, and a purge line connected to said canister, comprising steps of:

providing a control valve for controlling purge flow rate in the purge line;

providing a directional valve connected between the intake pipe and the purge line a first tube diverged from the intake pipe and a second tube diverged from the purge line;

providing a pressure sensor connected, in a general mode, to the intake pipe through the first diverged tube by switching the directional valve and measuring a pressure in the intake pipe and, in a evapo-purge mode, providing the pressure sensor connected to the purge line through the second diverged tube by switching the directional valve and measuring pressures in the purge line produced when the purge control valve is closed and open; wherein when engine operating conditions satisfy examining conditions, said pressure sensor measures the pressures in the purge line produced when the purge control valve is closed and open; and discriminating the evapo-purge system to achieve a diagnosis where the evapo-purge system is determined to be abnormal when subtraction of the measured value of the pressure in the purge line produced when the purge control valve is closed and the measured value of the pressure in the purge line produced when the purge control valve is open yields a difference outside a predetermined range wherein an atmospheric pressure value measured by the pressure sensor is fixed to a predetermined value when the evapo-purge system is concluded to be abnormal.

7. A diagnosis apparatus for an evapo-purge system of an automotive vehicle having, an engine for driving the vehicle, a fuel tank mounted on the vehicle for containing a fuel, an intake pipe connected to the engine for inducing air thereof, a purge line connected between the fuel tank and the intake pipe for purging an evaporated fuel vapor to the intake pipe, and a canister inserted in the purge line for storing the evaporated fuel vapor generated from the fuel tank, comprising:

a purge control valve inserted in the purge line for controlling an amount of the evaporated fuel vapor in dependency on driving conditions of the engine;

a first line connected to the intake pipe at an approximately downstream position from a connecting point of the purge line with the intake pipe;

a second line connected to the purge line at an approximately intermediate position between the canister and the intake pipe;

for detecting a first inside pressure of the purge line and a second inside pressure of the purge line when the purge control valve is turned off and for generating a first signal when a first inside pressure is detected and a second signal when a second inside pressure is detected;

a directional valve connected with the pressure sensor and communicated with the first and second lines for changing a communication of the first line or the second line to the pressure sensor; and judging means responsive to the first and second signals for deriving a difference between the first and second inside pressures and for deciding the evapo-purge system as a malfunction if the difference is smaller than a first predetermined value or larger than a second predetermined value that is larger than the first predetermined value.

8. The diagnosis apparatus according to claim 7, wherein the pressure sensor detects the inside pressures when the purge control valve continues a repetition of closing and opening operations for purging while the engine is operated in a steady state.

9. The diagnosis apparatus according to claim 7, wherein the first signal is used for other controls of the engine as a value representing an atmospheric pressure when the purge control valve is closed and when the evapo-purge system is judged normal.

10. The diagnosis apparatus according to claim 7, wherein the first and second predetermined values vary in accordance with a load to the engine.

11. The diagnosis apparatus according to claim 7, wherein the first and second predetermined values are stored in a table.

12. The diagnosis apparatus according to claim 7, wherein the first and second predetermined values are determined in accordance with engine operating conditions when the engine is in steady state.

13. The diagnosis apparatus according to claim 7, wherein the first and second predetermined values are decided in accordance with one of or a combination of parameters indicative of load, vehicle environmental conditions, and engine operating conditions.

14. A diagnosis method for an evapo-purge system of an automotive vehicle having, an engine for driving the vehicle, a fuel tank mounted on the vehicle for containing a fuel, an intake pipe connected to the engine for inducing air thereof, a purge line connected between the fuel tank and the intake pipe for purging evaporated fuel vapor to the intake pipe, and a canister inserted in the purge line for storing evaporated fuel vapor generated from the fuel tank, comprising the steps of:

purging the evaporated fuel vapor from the fuel tank to the intake pipe via the purge line;

controlling an amount of the evaporated fuel vapor in dependency on driving conditions of the engine;

providing a line connected between an upstream position of a purge control valve and the intake pipe;

inserting a directional valve in the line therebetween;

changing a communication of the purge line and the intake pipe by the directional valve;

sensing inside pressures of the purge line and the intake pipe;

comparing the inside pressure of the purge line with that of the intake pipe;

calculating a difference between the inside pressures of the purge line and the intake pipe based on the comparison result; and deciding the evapo-purge system as a malfunction when the difference is smaller than a first predetermined value or larger than a second predetermined value that is larger than the first predetermined value.

15. The diagnosis method according to claim 14, wherein the sensing step is executed when the purge control valve continues closing and opening operations for purging while the engine is operated in a steady state.

16. The diagnosis method according to claim 14, further comprising the step of using the detected inside pressure of the purge line for other controls of the engine as a value representing an atmospheric pressure when the purge control is closed and when the evapo-purge system is judged normal.

17. The diagnosis method according to claim 14, further comprising the step of varying the first and second predetermined values in accordance with a load to the engine.

18. The diagnosis method according to claim 14, wherein the sensing step is interrupted when the engine operating condition is changed beyond a set range of diagnosis conditions.

19. The diagnosis method according to claim 18, wherein the calculated difference is abandoned when a difference between the engine operating conditions at a starting time of the diagnosis and at an ending time of the diagnosis exceeds the set range.

20. The diagnosis method according to claim 14, wherein the diagnosis is suspended when the pressure is judged as said malfunction.

21. The diagnosis method according to claim 14, further comprising the step of fixing the sensed inside pressure of the purge line at a predetermined value when the evapo-purge system is determined as being in an abnormal condition.

22. A diagnosis apparatus for an evapo-purge system of an automotive vehicle having, an engine for driving the vehicle, a fuel tank mounted on the vehicle for containing a fuel, an intake pipe connected to the engine for inducing air thereof, a purge line connected between the fuel tank and the intake pipe for purging evaporated fuel vapor to the intake pipe, and canister inserted in the purge line for storing the evaporated fuel vapor generated from the fuel tank, comprising:

a purge control valve inserted in the purge line for controlling an amount of the evaporated fuel vapor in dependency on driving conditions of the engine;

a line connected to the purge line at an approximately intermediate distance position between the canister and the intake pipe;

a pressure sensor connected to the line for detecting a first inside pressure of the purge line when the purge control valve is closed and a second inside pressure of the purge line when the purge control valve is opened and for generating a signal for each of the first and second inside pressures of the purge line; and judging means responsive to the signal for deriving a difference between the first and second inside pressures and for deciding the evapo-purge system as a malfunction if the difference is smaller than first predetermined value or larger than a second predetermined value that is larger than the first predetermined value.

23. A diagnosis method for an evapo-purge system of an automotive vehicle having, an engine for driving the vehicle, a fuel tank mounted on the vehicle for containing a fuel, an intake pipe connected to the engine for inducing air thereof, a purge line connected between the fuel tank and the intake pipe for purging an evaporated fuel vapor to the intake pipe, and a canister inserted in the purge line for storing the evaporated fuel vapor generated from the fuel tank, comprising the steps of:

purging the evaporated fuel vapor from the fuel tank to the intake pipe via the purge line;

controlling an amount of the evaporated fuel vapor in dependency on driving conditions of the engine;

providing a line connected to the purge line;

sensing a first inside pressure of the purge line when the purging is executed and a second inside pressure of the purge line when the purging is stopped;

comparing the first and second inside pressures with each other;

calculating a difference between the inside pressures based on the comparison result; and deciding the evapo-purge system as a malfunction when the difference is smaller than a first predetermined value or larger than a second predetermined value that is larger than the first predetermined value.

* * * * *